United States Patent
Grimm et al.

(10) Patent No.: US 10,800,945 B2
(45) Date of Patent: Oct. 13, 2020

(54) MULTI-LAYER CARRIER FILM COMPOSED OF PLASTIC

(71) Applicant: LOPAREX GERMANY GMBH & CO. KG, Forchheim (DE)

(72) Inventors: Felix Grimm, Röttenbach (DE); Jürgen Panhans, Erlangen (DE)

(73) Assignee: LOPAREX GERMANY GMBH & CO. KG, Forchheim (DE)

( * ) Notice: Subject to any disclaimer, the term of this patent is extended or adjusted under 35 U.S.C. 154(b) by 257 days.

(21) Appl. No.: 15/907,418

(22) Filed: Feb. 28, 2018

(65) Prior Publication Data

US 2018/0223130 A1 Aug. 9, 2018

Related U.S. Application Data

(63) Continuation of application No. PCT/EP2016/001497, filed on Sep. 5, 2016.

(30) Foreign Application Priority Data

Sep. 11, 2015 (DE) .................. 10 2015 011 642

(51) Int. Cl.
| | |
|---|---|
| C09J 7/29 | (2018.01) |
| C09J 7/38 | (2018.01) |
| C09J 133/08 | (2006.01) |
| C09J 121/00 | (2006.01) |
| B32B 27/08 | (2006.01) |
| B32B 27/32 | (2006.01) |
| B32B 27/30 | (2006.01) |
| B32B 27/28 | (2006.01) |
| B32B 7/00 | (2019.01) |

(52) U.S. Cl.
CPC .............. *C09J 7/29* (2018.01); *B32B 7/00* (2013.01); *B32B 27/08* (2013.01); *B32B 27/28* (2013.01); *B32B 27/30* (2013.01); *B32B 27/302* (2013.01); *B32B 27/308* (2013.01); *B32B 27/32* (2013.01); *C09J 7/383* (2018.01); *C09J 7/385* (2018.01); *C09J 121/00* (2013.01); *C09J 133/08* (2013.01); *B32B 2250/03* (2013.01); *B32B 2250/246* (2013.01); *B32B 2255/10* (2013.01); *B32B 2255/26* (2013.01); *B32B 2270/00* (2013.01); *B32B 2405/00* (2013.01); *C09J 2201/122* (2013.01); *C09J 2201/162* (2013.01); *C09J 2201/606* (2013.01); *C09J 2201/61* (2013.01); *C09J 2203/334* (2013.01); *C09J 2421/00* (2013.01); *C09J 2423/003* (2013.01); *C09J 2423/006* (2013.01); *C09J 2433/00* (2013.01); *C09J 2433/003* (2013.01); *C09J 2433/006* (2013.01); *C09J 2453/00* (2013.01); *C09J 2453/003* (2013.01); *C09J 2453/006* (2013.01)

(58) Field of Classification Search
None
See application file for complete search history.

(56) References Cited

U.S. PATENT DOCUMENTS

| | | |
|---|---|---|
| 6,844,079 B2 | 1/2005 | Holzer et al. |
| 7,622,176 B2 | 11/2009 | Bardiot et al. |
| 2004/0146730 A1 | 7/2004 | Holzer et al. |
| 2006/0029824 A1 | 2/2006 | Gringoire et al. |
| 2007/0275623 A1 | 11/2007 | Mussig |
| 2010/0316843 A1 | 12/2010 | Chu et al. |
| 2017/0121570 A1 * | 5/2017 | Taya .................. B32B 27/08 |

FOREIGN PATENT DOCUMENTS

| | | | |
|---|---|---|---|
| DE | 10 2008 021841 A1 | 11/2009 | |
| EP | 1 397 249 B1 | 10/2009 | |
| WO | 97/00922 A1 | 1/1997 | |
| WO | 02/064694 A1 | 8/2002 | |
| WO | 2005/023541 A1 | 3/2005 | |
| WO | 2006/041654 A1 | 4/2006 | |
| WO | 2013/154877 A1 | 10/2013 | |
| WO | WO-2015193991 A1 * | 12/2015 | ......... H01L 21/6836 |

OTHER PUBLICATIONS

Wikipedia hot-melt adhesive, URL: https://en.wikipedia.org/wiki/Hot-melt_adhesive [abgerufen am Jun. 5, 2016].
German Search Report for corresponding Application No. 10 2015 011 642.8, dated Oct. 5, 2016.
International Search Report dated Nov. 17, 2016, dated Nov. 28, 2016.
English Translation of International Search Report dated Nov. 17, 2016, dated Nov. 28, 2016.

* cited by examiner

*Primary Examiner* — Frank D Ducheneaux
(74) *Attorney, Agent, or Firm* — The Dobrusin Law Firm, P.C.

(57) ABSTRACT

A multi-layer plastic film as a carrier film for a glue layer, comprising a layer sequence of (a) an outer layer (a) based on a mixture of α) 3-15 wt % of an extrudable glue and β) 85-97 wt % of at least one $C_2$-$C_8$ olefin-alkyl acrylate copolymer, $C_2$-$C_8$ olefin-methacrylic acid copolymer and/or $C_2$-$C_8$ alkyl methacrylate copolymer, wherein the mixture of α) and β) must be compatible with each other, (b) a layer (b) of at least one polyolefin or one olefin copolymer, (c) a layer (c) of at least one polyolefin or one olefin copolymer, and optionally typical auxiliary substances, as a second outer layer, and composites of said carrier film and an adhesive layer.

12 Claims, No Drawings

MULTI-LAYER CARRIER FILM COMPOSED OF PLASTIC

This application is a Continuation of International Patent Application No. PCT/EP2016/001497, filed Sep. 5, 2016, which claims foreign priority benefit under 35 U.S.C. § 119 of German Patent Applications 10 2015 011 642.8, filed Sep. 11, 2015, the contents of which are incorporated herein by reference.

The present invention relates to a multilayer plastics film as backing film for an adhesive layer comprising a layer sequence made of an external layer (a) based on a mixture of α) from 3 to 15% by weight, preferably from 4 to 12% by weight, of an extrudable adhesive and β) from 85 to 97% by weight, preferably from 88 to 96% by weight, of at least one $C_2$-$C_8$ olefin/acrylic acid copolymer or $C_2$-$C_8$ olefin/alkyl acrylate copolymer, $C_2$-$C_8$ olefin/methacrylic acid copolymer and/or $C_2$-$C_8$ alkyl methacrylate copolymer, where the mixture of α) and β) must always amount to 100% by weight and the two mixture components α) and β) must be mutually compatible, and, adjacent to the layer (a) and, respectively, layer (c), a layer (b) made of at least one polyolefin or one olefin copolymer, preferably a $C_2$-$C_6$ polyolefin or a copolymer of $C_2$-$C_6$ olefins, particularly preferably a $C_2$-$C_3$ polyolefin, and, as second external layer, a layer (c) made of at least one polyolefin or one olefin copolymer, preferably a $C_2$-$C_6$ polyolefin or a copolymer of $C_2$-$C_6$ olefins, particularly preferably a $C_2$-$C_3$ polyolefin and optionally of conventional auxiliaries, preferably antiblocking agents, and to an item with adhesive capability, preferably an adhesive tape, with said multilayer plastics film as backing film.

BACKGROUND OF THE INVENTION

It is known that backing films made of plastic must have adequate adhesion to an adhesive coating in order to ensure adequate adhesion between the adhesive layer and the backing film not only during the handling of composites such as adhesive tapes but also after use of these. Only by this means can such adhesive tapes, for example, when used correctly, achieve adequate precision and, respectively, retain their integrity during storage.

This necessary adhesion in the composite is usually achieved by subjecting a surface layer of the backing films to corona treatment, flame treatment or plasma treatment and/or by applying an adhesion-promoter layer or a primer layer thereon, thus substantially avoiding separation of the adhesive layer from the backing layer. It should also be noted that these adhesion-promoter layers or primer layers are usually selected to be appropriate for the respective adhesive system intended for use, the composition of which mostly differs, depending on manufacturer.

Accordingly, there has been no lack of attempts to provide backing films which can be used for adhesive coatings of very different types but which do not require any of the pretreatments mentioned or any primer layer selected to be appropriate for the adhesive system of the adhesive layer, or any adhesion-promoter layer, the aim here being not merely to reduce costs but also to minimize the consumption of fossil feedstocks through the provision of appropriate polymers for these connecting layers.

Despite these attempts, there is a continuing need to provide, as backing films, plastics films which can ensure adequate adhesion in the composite with an adhesive coating based on various adhesive systems, without any treatment such as corona treatment, flame treatment or plasma treatment, without primer layer or adhesion-promoter layer, and can also do so when subjected to mechanical loading in accordance with correct use.

This object is achieved via provision of the multilayer plastics film of the invention as backing film for a coating made of various adhesives.

SUMMARY OF THE INVENTION

The present invention therefore relates to a multilayer plastics film as backing film for an adhesive layer, preferably made of various adhesives, comprising a layer sequence made of a) an external layer (a) based on a mixture of α) from 3 to 15% by weight, preferably from 4 to 12% by weight, of at least one extrudable adhesive and β) from 85 to 97% by weight, preferably from 88 to 96% by weight, of at least one $C_2$-$C_8$ olefin/acrylic acid copolymer, $C_2$-$C_8$ olefin/alkyl acrylate copolymer, $C_2$-$C_8$ olefin/methacrylic acid copolymer and/or $C_2$-$C_8$ alkyl methacrylate copolymer, where the mixture of α) and β) must always amount to 100% by weight and the two mixture components α) and β) must be mutually compatible, b) directly adjoining the layer (a) and, respectively, layer (c), a layer (b) made of at least one polyolefin or one olefin copolymer, preferably a $C_2$-$C_6$ polyolefin or a copolymer of $C_2$-$C_6$ olefins, particularly preferably a $C_2$-$C_3$ polyolefin, c) as second external layer, a layer (c) made of at least one polyolefin or one olefin copolymer, preferably a $C_2$-$C_6$ polyolefin or a copolymer of $C_2$-$C_6$ olefins, particularly preferably a $C_2$-$C_3$ polyolefin and optionally of conventional auxiliaries, preferably antiblocking agents.

DETAILED DESCRIPTION

Olefin homo- and copolymers suitable for the production of the layer (b) of the multilayer plastics film of the invention are, preferably thermoplastic olefin homo- or copolymers of ethylene and/or propylene, with other α,β-unsaturated olefins having from 6 to 10 carbon atoms, i.e. 6, 7, 8, 9 or 10 carbon atoms. Suitable olefin homopolymers are preferably selected from the group comprising ethylene homopolymers (polyethylenes, PE), preferably LDPE and HDPE, propylene homopolymers (polypropylenes, PP) and mixtures of at least two of the polymers mentioned. "LDPE" is the term used for low-density polyethylenes which have a density in the range from 0.86 to 0.93 g/cm³ and which feature a high degree of molecular branching. "HDPE" is the term used for high-density polyethylenes which have only a low degree of molecular-chain branching, where the density may be in the range between 0.94 and 0.97 g/cm³. Suitable olefin copolymers are preferably copolymers of ethylene and propylene and copolymers of ethylene and/or propylene and at least one α-olefin having at least 6, preferably having 6-10, particularly preferably having 6-8 carbon atoms, very particularly preferably copolymers of ethylene and/or propylene with at least one α-olefin selected from the group comprising hexene and octene, the proportion of these in the olefin copolymer preferably being at most 25 mol %, particularly preferably at most 15 mol %, based in each case on the total weight of the olefin copolymer. Particularly suitable copolymers of ethylene and at least one α-olefin having at least four carbon atoms are LLDPE and/or mPE. "LLDPE" is the term used for low-density linear ethylene copolymers which are characterized by the presence of a linear main chain with pendant chains located thereon, and the density of which is in the range from 0.86 to 0.94 g/cm$^3$. "mPE" is the term used for ethylene copolymers which have been polymerized by means of metallocene catalysts, their density preferably being in the range from 0.88 to 0.93 g/cm$^3$.

The layer (b) of the multilayer film of the invention is preferably based on at least one ethylene homo- and/or copolymer, particularly preferably on at least one LDPE, on at least one copolymer of ethylene and propylene or on at least one copolymer of ethylene and of at least one α-olefin having at least six carbon atoms, preferably hexene and/or octene, for example mPE.

The layer (c) is likewise composed of at least one polyolefin or one olefin copolymer.

The polyolefins and olefin copolymers listed for the layer (b) are also suitable for the production of the layer (c).

The layer (c) can be composed of polymer components which, in relation to the layer (b), are identical or different, preferably identical polymer components.

The layer (a) is based on a mixture of from 3 to 15% by weight, from 4 to 12% by weight, or particularly preferably from 5 to 10% by weight, of at least one extrudable adhesive as mixture component α) and from 85 to 97% by weight, preferably from 88 to 96% by weight, or particularly preferably from 90 to 95% by weight, of the polymer component as mixture component β), where the mixture of α) and β) must always amount to 100% by weight.

The mixture components α) and β) must be mutually compatible.

In particular, the layer (a) of the plastics film of the invention, as an external layer of the backing film, is based on a mixture of an extrudable adhesive and of at least one $C_2$-$C_8$ olefin/acrylic acid copolymer and/or $C_2$-$C_8$ olefin/alkyl acrylate copolymer, 02-08 olefin/methacrylic acid copolymer and/or $C_2$-$C_8$ alkyl methacrylate copolymer.

In a preferred embodiment, the polymer component β) of the mixture of which the layer (b) is composed is at least one copolymer of at least one olefin having from 2 to 4, i.e., 2, 3 or 4 carbon atoms, preferably having 2 or 3 carbon atoms, and of at least one other α,β-unsaturated, non-olefinic monomer.

Materials suitable for the production of these copolymers are preferably at least one olefin selected from the group comprising ethylene and propylene and at least one other α,β-unsaturated non-olefinic monomer having at least one oxygen-containing group, preferably at least one ester group and/or one carboxylic acid group. Particularly suitable materials are copolymers of at least one olefin having from 2 to 4 carbon atoms, preferably having from 2 to 3 carbon atoms, and of at least one monomer selected from the group comprising alkyl acrylates, preferably $C_{1-4}$-alkyl acrylates, particularly preferably methylacrylate, ethylacrylate, n- and isopropyl acrylate, n- and isobutyl acrylate, tert-butyl acrylate, 2-ethylhexyl acrylate, cyclohexyl acrylate and isobornyl acrylate, acrylic acid and salts thereof, alkyl methacrylate, preferably from C1-C4 alkyl methacrylates, particularly preferably methyl methacrylate, ethyl methacrylate, n- and isopropyl methacrylate, n- and isobutyl methacrylate, tert-butyl methacrylate, 2-ethylhexyl methacrylate, cyclohexyl methacrylate and isoboryl methacrylate, methacrylic acid and salts thereof. Particular preference is given to at least one α,β-unsaturated, non-olefinic monomer selected from the group comprising methyl acrylate, n-butyl acrylate, acrylic acid, methyl methacrylate, n-butyl methacrylate and methacrylic acid.

It is preferable that the proportion of olefin in the copolymer of at least one olefin preferably having from two to three carbon atoms and at least one other α,β-unsaturated, non-olefinic monomer of the polymer component β) of the mixture is at least 65% by weight, preferably at least 70% by weight, very particularly preferably at least 80% by weight.

It is preferable that the polymer component β) of the layer (a) of the multilayer film of the invention is at least one copolymer of ethylene and/or propylene and of at least one other α,β-unsaturated non-olefinic monomer selected from the group comprising alkyl acrylates, preferably $C_{1-4}$-alkyl acrylates, acrylic acid, alkyl methacrylates, preferably $C_{1-4}$ alkyl methacrylates and methacrylic acid.

In a preferred embodiment, the extrudable adhesive component α) of the mixture of which the layer (a) is composed is based on extrudable adhesive systems or, respectively, adhesives based on at least one block copolymer of styrene and at least one olefin, preferably a $C_2$-$C_4$ olefin, and a tackifier resin component, where the two components α) and β) of the mixture must be mutually compatible. It is preferable to use, as adhesive, a mixture of a styrene-isoprene block copolymer with at least one tackifier resin selected from the group comprising kolophonium, derivatives thereof, optionally hydrogenated kolophonium esters, polyterpenes, phenolic terpenes and derivatives thereof. Other rubber-based extrudable adhesives can also be used as adhesive component α), examples being homo- or copolymers of isobutylene, of vinyl acetate, of ethylene, of acrylic esters, of butadiene or of isoprene, preferably based on acrylic ester, vinyl acetate and/or isoprene optionally with a tackifier resin component and other additives, where these adhesive components α must always be extrudable and compatible with the mixture component β).

The layers (b) and (c) of the plastics film of the invention can respectively have the same or different additives or stabilizers selected from the group comprising antioxidants, antiblocking agents, antifogging agents, antistatic agents, antimicrobial actives, light stablizers, UV absorbers, UV filters, dyes, color pigments, stabilizers, preferably heat stabilizers, process stabilizers and UV and/or light stabilizers, preferably based on at least one sterically hindered amine (HALS), process auxiliaries, flame retardants, nucleating agents, crystallization agents, preferably crystal nucleating agents, lubricants, optical brighteners, plasticizers, spacers, fillers such as $CaCO_3$, silicates, waxes, wetting agents, surface-active compounds, preferably surfactants, and dispersing agents.

The layers of the multilayer plastics film of the invention can comprise at least 0.01 to 15% by weight, preferably at least 0.1 to 10% by weight, based in each case on the total weight of an individual layer, of at least one of the abovementioned additives, where the layer (c) preferably comprises at least one antiblocking agent.

The thickness of the layer (b) and of the layer (c) can optionally be identical. However, it is preferable that the thickness of the layer (c) is smaller by at least 10%, preferably by up to 20%, than the thickness of the layer (b), in particular when it comprises functionalizing additives such as antiblocking agents.

The thickness of the layers (b) and (c), being identical or different, can therefore be ≥5 μm, preferably 10 μm, where the thickness of the layer (c) can be preferably from 5 to 15 μm and that of the layer (b) can be from 15 to 60 μm.

The plastics film of the invention features problem-free unrolling from the rolled condition despite addition of the adhesive component α) in the layer (a).

The multilayer plastics film of the invention is in particular suitable as backing film for an adhesive layer (d), which can be directly coated on the layer (a) without any prior corona treatment, flame treatment or plasma treatment, without any application of an adhesion-promoter layer or any application of a primer layer with excellent adhesion in the composite, where the composition of these additives used can vary and many of said adhesives are obtainable commercially.

This adhesive layer (d) can be based on an adhesive which corresponds to the mixture component α) or differs from said mixture component α).

Accordingly, the adhesive layer (d) can also be based on an extrudable adhesive, preferably melt adhesive, particularly preferably on a rubber-based hotmelt adhesive. Appropriate extrudable adhesives with varying composition are obtainable commercially.

This also applies to acrylate- or methacrylate-based adhesives, where these can be used for the production of the adhesive layer (d). This class of adhesives comprises mainly non-extrudable adhesives.

The expressions "acrylate-based adhesive" and "methacrylate-based adhesive" used in the invention mean adhesives of which the main polymer component is an acrylate homopolymer and/or copolymer and, respectively, a methacrylate homopolymer and/or copolymer.

It is particularly preferable that the layer (d) is based on a pressure-sensitive adhesive which under pressure at temperatures as low as ambient temperature has adequate adhesion to various surface materials.

The plastics film of the invention can be produced by known production methods, an example being extrusion or coextrusion.

It is possible here to produce either individual layers or all of the layers of this multilayer plastics film by extrusion, in particular by blown-film extrusion and/or flat-film extrusion (cast extrusion), or coextrusion, preferably blown-film coextrusion and/or flat-film coextrusion (cast coextrusion), preference being given here to blown-film coextrusion. It should be noted here that if the layers, in particular the layer (c), are/is doped with additives, these are processed via blending, optionally in the form of masterbatch, with the polymer component(s) of the respective layer. This can be dry pellet/powder blending or dry pellet/pellet blending. However, it is also possible to add the additive to the molten polymer component(s) of the respective layer, preferably via metered addition in an extruder used for the extrusion of the respective layer.

In the case of production via extrusion, the melts corresponding to the individual layers of the plastics film of the invention are simultaneously (co)extruded together through an annular die or a flat-film die, and if an annular die is used the resultant film is air-blown and cooled, or if a flat-film die is used the resultant film is drawn off for solidification with the aid of rolls and cooled.

The plastics film of the invention is not subjected to monoaxial or biaxial stretching (orientation), and therefore has no monoaxial or biaxial orientation.

To the extent that the adhesive of the adhesive layer (d) is extrudable, this can simply be applied by (co)extrusion.

To the extent that the adhesive is non-extrudable, this is then applied, optionally after intermediate storage, to the layer (a) of the film of the invention.

The coating of the layer (a) of the plastics film of the invention with adhesive can be achieved via application of a solution or a dispersion of the adhesive, optionally with a crosslinking agent, in a known manner, where the solvent, or the solvent-containing or aqueous dispersion medium, is then removed via drying of the coating. However, it is also possible, preferably in accordance with the viscosity of the adhesive system, to apply this with the aid of suitable coating devices only, without any need for subsequent drying of the system as in the case of application of a dispersion. In the case of each of these systems used for the coating procedure, the adhesive can then also optionally be crosslinked by exposure to UV radiation during or after the coating procedure. This can preferably be the appropriate coating option for application of a pressure-sensitive adhesive as adhesive of the layer (d).

The present invention therefore moreover also provides a composite made of a multilayer plastics film of the invention as backing film and an adhesive layer (d) on the layer (a), where there is no adhesion-promoter layer or primer layer present between the connected layers (a) and (d).

The multilayer plastics film of the invention can in particular be used as backing film for the production of items having adhesive capability. By coating of the backing film of the invention with an adhesive layer (d) it is preferably possible to produce adhesive tapes or adhesive labels, preferably self-adhesive adhesive tapes or self-adhesive labels. These composites not only feature excellent adhesion in the composite between the layers of the backing film and the adhesive layer (d) but in addition thereto exhibit high impermeability to moisture, in particular impermeability to water. The composites of the invention, preferably adhesive tapes, can therefore provide excellent retention of integrity during storage, and also during use in the external region of buildings, for example roof coverings and other sealant systems providing protection from effects of weathering, without any delamination between the backing film and the adhesive coating (d).

The present invention therefore also provides an adhesive tape made of a multilayer plastics film of the invention as backing film and of an adhesive layer (d), or an adhesive label made of a multilayer plastics film of the invention as backing film and of an adhesive layer (d), where in each case the layer (a) has direct connection to the adhesive layer (d) without adhesion-promoter layer or primer layer, and where in both instances a pressure-sensitive adhesive is preferably used as self-adhesive adhesive for the layer (d).

Peel Strength Test

1. Peel Strength was Tested by a Method Based on EN ISO 11339 2010.

The test serves to establish the adhesion in the composite between an adhesive coating and a backing film of the invention and, respectively, a comparative backing film. Peel strength between coatings with different adhesive compositions on said backing films was measured by bonding the layer (a) of the respective backing film as explained below to the adhesive layer of commercially available adhesive tapes with adhesive coatings based on acrylates or on rubbers.

The following commercially available adhesive tapes were used:

Tesa A 7475: Acrylate

Tesa K 7476: Natural rubber

2. Production of Sample Strips

A strip made of one of the test adhesive tapes listed was adhesive-bonded in machine direction to the respective multilayer backing film of the invention or comparative backing film. The length of the test adhesive tape strip was 24 cm, of which 18 cm were adhesive-bonded to a strip made of the respective backing film and 6 cm were not involved in adhesive bonding. The width of the adhesive tape strip was 2.5 cm. Each series of measurements required three test adhesive tape strips. The test adhesive tape strip applied to the layer (a) of the respective backing film was first subjected to gentle pressure by using a rubber roll on the backing film strip, in order to eliminate air inclusions. This resultant sample strip was then subjected to two slow passes of a Finat 10 roller (weight: 2 kg) in both directions in order to allow the intrinsic weight of the roller to act on the sample strip and thus ensure uniform sample preparation. The sample strips were then conditioned. This is necessary in order, through exposure to pressure and heat, to accelerate achievement of the maximum achievable adhesion in the composite between backing film and adhesive layer. The pressure increase required to bond the adhesive layer of the test adhesive tape to the respective backing film was achieved by retaining the respective sample strips between two metal plates and weights, where a pressure of 70 g/cm$^2$ was exerted on each sample strip for a period of 20 hours at a temperature of 40° C. The sample strips were then kept for about 1 hour at room temperature (23° C.), and then tested.

3. Method

The peel strength test was conducted by a method based on DIN EN ISO 11339:2010 with the aid of a tensile tester 1120.25 from Zwick/Roell. The force is introduced at the sample strip ends not involved in adhesive bonding. For this purpose, the sample strip ends not involved in adhesive bonding were fixed in a clamp. The clamping device is self-orienting, and when the clamps experience a force they can therefore move in a straight line with the sample strip. The sample strip end with the test adhesive tape was clamped into the lower, rigid clamp. The backing film to be tested was secured in the upper clamp and pulled vertically upward by the clamp. The two ends not involved in adhesive bonding were thus secured in opposite direction and formed a T-shaped arrangement. The angle between the adhesive layer and the direction of the force was not fixed, but instead was flexibly self-adjusting during the test. The distance traversed in millimeters is recorded as a function of the input force, which is stated in cN/cm. The force acts linearly on the sample strip in this measurement method. The traverse velocity, i.e. the tensile velocity, was 10 mm/min. This rather low velocity ensured that the adhesive was able to modify itself in response to the effects of the exterior force (plastic deformation). The tensile traverse length was 75 mm.

The following inventive examples and comparative examples serve to illustrate the invention, but are not to be interpreted as restrictive.

I. Chemical Characterization of the Raw Materials Used

All of the % data below are % by weight unless otherwise stated.
EBA: Ethylene/n-butyl acrylate copolymer (16% of BA)
LDPE: Low-density polyethylene [0.923 g/cm$^3$]
Multibatch MP 525659 Talc powder Masterbatch (PP homopolymer with 60% of talc powder)
Rem. RCL white Titanium dioxide masterbatch in LDPE
EAA Ethylene/acrylic acid copolymer
EMA Ethylene/methyl acrylate copolymer
BOSTIK M 550 hotmelt Extrudable rubber-based hotmelt adhesive from BOSTIK II. Production of Backing Films The backing films of the inventive examples and comparative examples are in each case composed of three layers with the compositions stated below in Table I, and in each case have a total layer thickness of 62 µm. All of the backing films were produced by blown-film coextrusion. The peel strength of the backing film was determined by the stated method for the determination of peel strength in relation to the stated commercially available adhesive tapes.

III. Compositions of the Layers

Inventive Example 1

| | Raw materials, % by weight | | Thickness |
|---|---|---|---|
| Layer (a) | EBA 90% | HOTMELT 10% | 12 µm |
| Layer (b) | LDPE 84% | TiO$_2$ MASTERBATCH 16% | 48 µm |
| Layer (c) | LDPE 96% | TALC POWDER MASTERBATCH 4% | 12 µm |

Comparative Example 1

| | Raw materials, % by weight | | Thickness |
|---|---|---|---|
| Layer (a) | | EBA 100% | 12 µm |
| Layer (b) | LDPE 84% | TiO$_2$ MASTERBATCH 16% | 48 µm |
| Layer (c) | LDPE 96% | TALC POWDER MASTERBATCH 4% | 12 µm |

Inventive Example 2

| | Raw materials, % by weight | | Thickness |
|---|---|---|---|
| Layer (a) | EAA 90% | HOTMELT 10% | 12 µm |
| Layer (b) | LDPE 84% | TiO$_2$ MASTERBATCH 16% | 48 µm |
| Layer (c) | LDPE 96% | TALC POWDER MASTERBATCH 4% | 12 µm |

Comparative Example 2

| | Raw materials, % by weight | | Thickness |
|---|---|---|---|
| Layer (a) | | EAA 100% | 12 µm |
| Layer (b) | LDPE 84% | TiO$_2$ MASTERBATCH 16% | 48 µm |
| Layer (c) | LDPE 96% | TALC POWDER MASTERBATCH 4% | 12 µm |

TABLE I

| | Acrylate adhesive | | | |
|---|---|---|---|---|
| Adhesive of | Layer (a) | % by weight | Peel force [cN/cm] | Fracture type |
| TESA A 7475 tape (acrylate adhesive) | EBA | 100 | 164.93 | Adhesive |
| | EBA/hotmelt | 90/10 | 269.35 | Adhesive |
| | EAA | 100 | 249.17 | Adhesive |
| | EAA/hotmelt | 90/10 | 357.84 | Adhesive |

TABLE II

Rubber adhesive

| Adhesive of | Layer (a) | % by weight | Peel force [cN/cm] | Fracture type |
|---|---|---|---|---|
| TESA K 7476 tape (rubber adhesive) | EBA | 100 | 217.28 | Adhesive |
| | EBA/hotmelt | 90/10 | 402.93 | Mixed |
| | EAA | 100 | 542.59 | Cohesive |
| | EAA/hotmelt | 90/10 | 551.03 | Cohesive |

What is claimed is:

1. A composite made of an adhesive layer (d) and of a multilayer plastics film as backing film comprising a layer sequence made of
    a) an external layer (a) formed of a mixture of α) from 3 to 15% by weight of an extrudable adhesive and β) from 85 to 97% by weight of at least one of a $C_2$-$C_8$ olefin/acrylic acid copolymer, a $C_2$-$C_8$ olefin/alkyl acrylate copolymer, a $C_2$-$C_8$ olefin/methacrylic acid copolymer or a $C_2$-$C_8$ alkyl methacrylate copolymer, where the mixture of α) and β) must always amount to 100% by weight and the two mixture components α) and β) must be mutually compatible,
    b) a layer (b) made of at least one of a polyolefin and an olefin copolymer where the layer (b) is immediately adjacent to the layer (a) and, respectively, a second external layer (c),
    c) as second external layer, a layer (c) made of at least one of a polyolefin and an olefin copolymer and optionally of additives or stabilizers,
    wherein the layer (a) has direct connection to the adhesive layer (d) and between the layer (a) and the adhesive layer (d) there is no adhesion-promoter layer or primer layer present and the mixture component α) of the layer (a) is different from an adhesive of the adhesive layer (d); and
    wherein the additives or stabilizers are selected from the group comprising antioxidants, antiblocking agents, antifogging agents, antistatic agents, antimicrobial actives, light stabilizers, UV absorbers, UV filters, dyes, color pigments, stabilizers, process auxiliaries, flame retardants, nucleating agents, crystallization agents, lubricants, optical brighteners, plasticizers, spacers, fillers, silicates, waxes, wetting agents, surface-active compounds, and dispersing agents.

2. The composite as claimed in claim 1, wherein in the layer (a), mixture component β) is at least one of an ethylene/$C_2$-$C_4$-alkyl acrylate copolymer and an ethylene/acrylic acid copolymer.

3. The composite as claimed in claim 1, wherein in the layer (a), mixture component β) is at least one of an ethylene/butyl acrylate copolymer and an ethylene/acrylic acid copolymer.

4. The composite as claimed in claim 1, wherein the layer (a) has, as mixture component α), an extrudable adhesive made of a mixture of at least one block copolymer of styrene and at least one olefin and of a tackifier resin component.

5. The composite as claimed in claim 4, wherein the mixture component α) is an extrudable adhesive made of a mixture of a styrene-isoprene block copolymer and of at least one tackifier resin selected from the group consisting of kolophonium, polyterpenes, phenolic terpenes, and derivatives thereof; optionally wherein derivatives of kolophonium includes a hydrogenated kolophonium ester.

6. The composite as claimed in claim 5, wherein the tackifier resin includes a hydrogenated kolophonium ester.

7. The composite as claimed in claim 1, wherein the adhesive layer (d) is formed of an extrudable rubber-based melt adhesive.

8. The composite as claimed in claim 1, wherein the adhesive layer (d) is formed of an acrylate-based adhesive.

9. An adhesive tape comprising the composite as claimed in claim 1.

10. An adhesive tape as claimed in claim 9, wherein the adhesive layer (d) is formed of a pressure-sensitive adhesive.

11. An adhesive label comprising the composite as claimed in claim 1.

12. An adhesive label as claimed in claim 11, wherein the adhesive layer (d) is formed of a pressure-sensitive adhesive.

* * * * *